May 23, 1961  C. LEAVELL  2,985,078
LOCALIZED VIBRATION ELIMINATION IN VIBRATORY
STRUCTURAL COMPOSITIONS
Filed Sept. 30, 1959  2 Sheets-Sheet 1
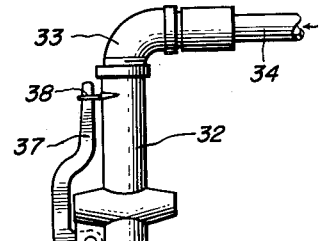
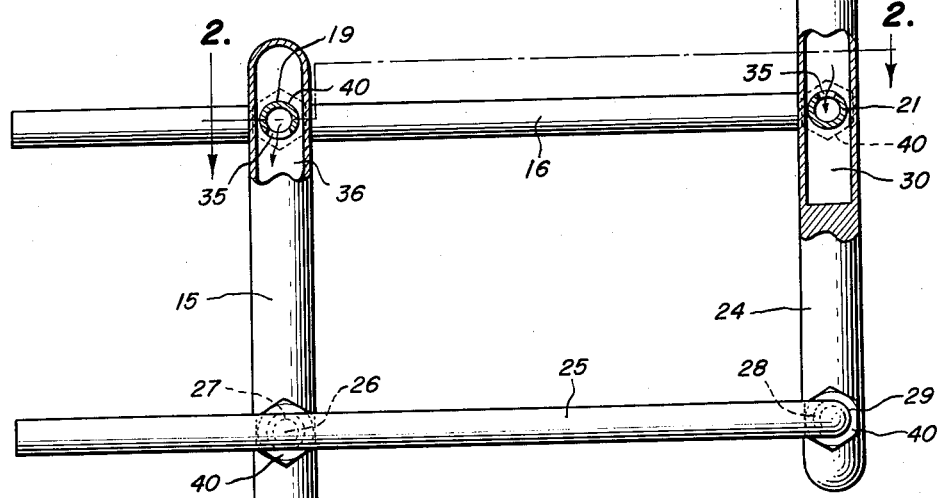
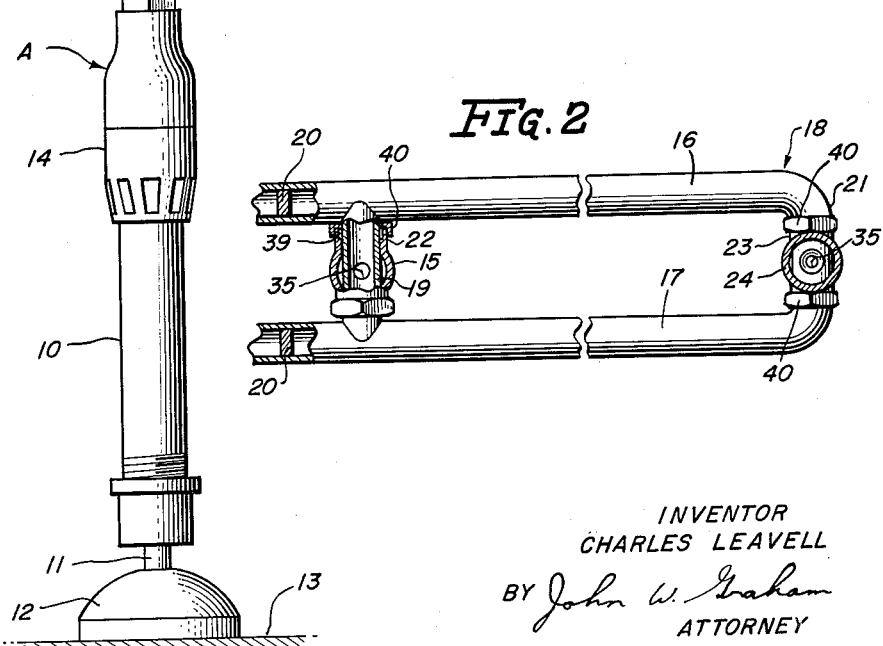
INVENTOR
CHARLES LEAVELL
BY John W. Graham
ATTORNEY

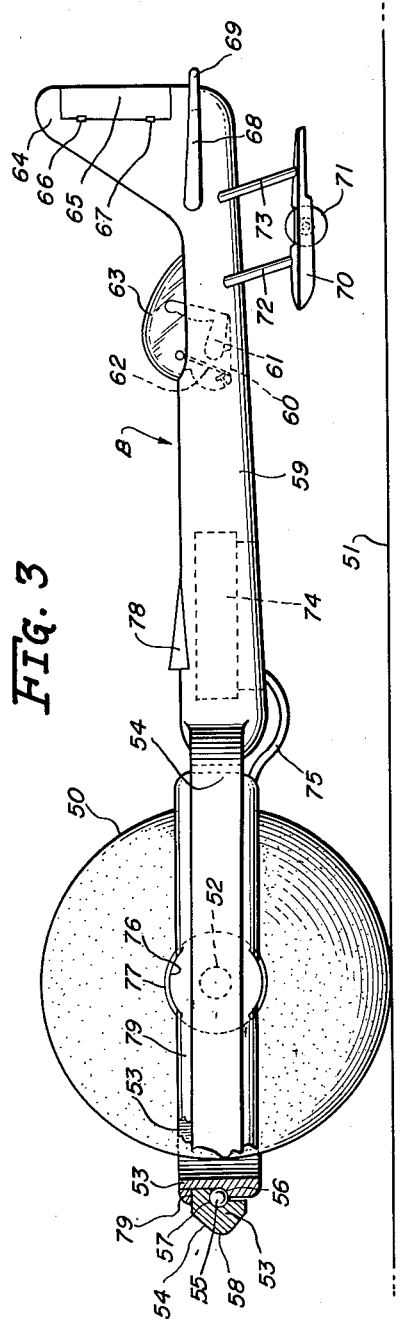
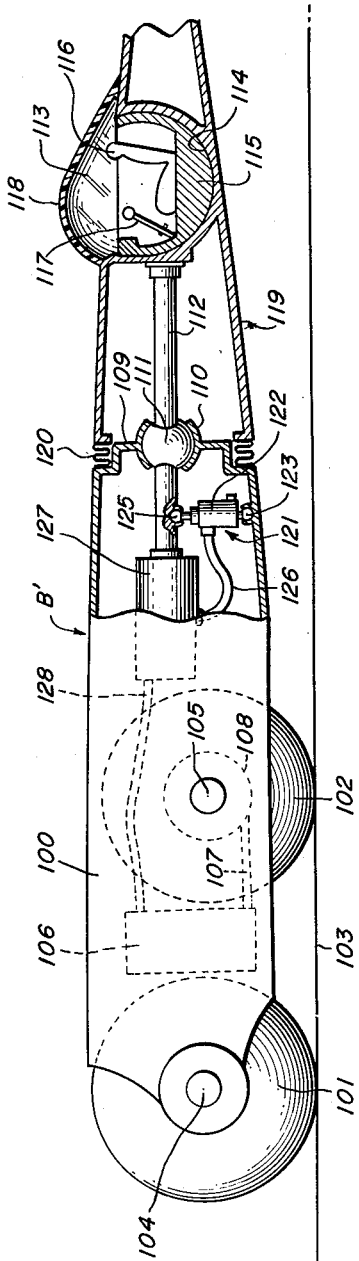

United States Patent Office 2,985,078
Patented May 23, 1961

2,985,078

LOCALIZED VIBRATION ELIMINATION IN VIBRATORY STRUCTURAL COMPOSITIONS

Charles Leavell, 206 S. Fairfield Ave., Lombard, Ill.

Filed Sept. 30, 1959, Ser. No. 843,491

31 Claims. (Cl. 94—48)

This invention relates to a system for eliminating the occurrence of vibration at a predetermined point along a linkage element in which the presence of vibration at that point is objectionable, but which element has vibration imparted to it because of its being usefully or necessarily coupled to a vibratory body. The invention is especially applicable to structural compositions wherein the vibratory amplitudes are quite large, and finds utility in many environmental settings as, for example, vibratory tools such as a sand tamper which advantageously does not have substantial vibrations transmitted to the handle-grip thereof and, as a further example, a vehicle adapted to high speed transportation over rough or irregular surfaces and having a compartment for a driver which, advantageously, does not have substantial vibrations transmitted thereto.

The present application is a continuation-in-part of my copending patent application, Serial No. 327,075, filed December 20, 1952.

The specific environmental settings for the invention have been selected for the reason that they are indicative of the versatility and breadth thereof, and also for the reason that they present particularly difficult problems in the consideration of vibration elimination because of the relatively large amplitude of the vibratory motions experienced by the vibratory bodies; and further because (in the case of the vehicle) two-directional vibrations are imparted to the vibratory body and the treatment of vibration elimination in such case necessarily encompasses a consideration of the less complex one-directional vibration elimination.

Referring to tools, there are many that vibrate during their operation and the general class of percussive tools is an exemplification thereof. For purposes of this invention, a sand tamper is specifically illustrated and described since such tool presents a particularly difficult problem in vibration elimination because the amplitude of the vibratory movement is quite large. More pointedly, the butt or earth-striking member of a sand tamper may vibrate with an amplitude of about six inches, and the casing or barrel of the tool, as a consequence, will vibrate through amplitudes approximating three inches. It will be apparent that it is exceedingly difficult to effectively control and operate a tool that vibrates with amplitudes of this order. Though there has long been a need for handle structures with which vibrating tools such as a sand tamper may be equipped, and that remain relatively stationary or vibrationless while the tool itself vibrates, so far as is known no means are presently available for equipping sand tampers and the like with a handle-grip that remains relatively vibrationless while the tool itself vibrates during its operation.

Referring to a vehicle adapted to high speed transportation over rough or irregular surfaces, the vibratory motions experienced by the wheel are sometimes in the order of several feet, and the elimination of such vibratory motions is indeed difficult. In this environment, the vibratory body is a mechanical component force-connected to a surface for support thereby, and specifically comprises the vehicle wheel which engages the irregular ground or other supporting surface and is caused to vibrate by the bumps or irregularities encountered by the wheel in its rolling action thereon. The direction of the principal vibrations imparted to such vibratory body (i.e., the wheel) by the supporting surface is along a line generally perpendicular thereto. However, since the character of such bumps or irregularities cannot be predicted, horizontally directed vibratory movements may also be imparted to the wheel. In this same environment, the linkage structure comprises that portion of the vehicle in which the introduction of vibration is objectionable and is the wheel-borne frame or body of the vehicle which includes the driver's or passenger's compartment as this substantially vibrationless portion. In this setting, the invention is comprised in a system for eliminating the transfer to the passenger compartment of two-directional vibrations usually analyzable into both vertical and horizontal components. Referring again to the case of the sand tamper, the vibratory body which is force-connected to a surface for support thereby is the casing or barrel of the tool, and this mechanical component is force-connected to such surface by the butt or earth-striking member of the tool. The linkage structure comprising the portion in which the introduction of vibration is objectionable is the casing-supported handle structure and includes a handle-grip as this substantially vibrationless portion.

Now whereas I have discovered a new and useful system for eliminating the transfer of vibration from a vibratory body to a given location along a second body in which the occurrence of vibration at that location is objectionable or undesirable but which is necessarily coupled to the vibratory body, the provision of such system in a useful embodiment is one of the objects of this invention. Another object of the invention is that of providing a system of the character described which is especially suited for use in environments in which the vibratory body exhibits relatively large-amplitude vibratory movements.

Still another object is to provide a bi-partite structural composition comprising a first vibratory body and a second body coupled thereto and to so locate the coupling with reference to a predetermined position along the second body that this position has substantially no vibration imparted thereto even though the first body experiences large-amplitude, erratic vibratory motions. A further object is in the provision of a system of the type described which is able to eliminate the transfer of multi-directional vibratory movements experienced by the first vibratory body to the predetermined location along the second body.

Yet a further object is to provide a high speed vehicle capable of movement over land and/or water surfaces, which is equipped with one or more wheels that are set in vibratory motion by the irregular character of the surfaces traversed thereby, and which has also a chassis or fuselage coupled at the center of percussion thereof either directly or indirectly to the wheel or wheels, such fuselage being provided with a passenger compartment located at the reference point for the center of percussion determination whereby the compartment remains relatively vibrationless although the wheels, and chassis at the aforesaid center of percussion thereof, experience vibratory movements of substantial amplitude.

Still another object is in the provision of a handle structure for vibrating tools that provides a relatively stationary or vibrationless handle-grip even though the tool itself vibrates. Yet another object is that of providing a vibrationless handle structure that may be attached readily to a conventional vibratory tool with a minimum of effort and expense, and which functions to define a substantially vibrationless handle-grip or hand-hold member while the casing of the tool vibrates through relatively large amplitudes.

An additional object of the invention is to provide a plurality of lever or handle components pivotally secured at their respective centers of percussion to the casing of a vibratory tool, and to provide a handle-grip or hand-hold member located with reference to such centers of percussion so that the handle-grip remains substantially vibrationless though the tool casing and lever members secured thereto vibrate during tool operation. Additional objects and advantages of the invention will become apparent as the specification develops.

Embodiments of the invention are illustrated in the accompanying drawings, in which—

Figure 1 is a side view in elevation of a sand tamper embodying the invention, and in which portions of the structure are broken away to illustrate constructional details; Figure 2 is a horizontal sectional view taken along the line 2—2 of Figure 1; Figure 3 is a side view in elevation of a vehicle embodying the invention, and in which portions of the structure are broken away and are shown in section to illustrate the construction thereof; and Figure 4 is a side view in elevation of a modified vehicle embodying the invention and in which portions of the vehicle structure are shown in section for clarity.

CENTER OF PERCUSSION CONSIDERATIONS

It is well known that if an impulsive force or blow is applied to a body freely pivotal about an axis extending therethrough, the body will be angularly accelerated. The resultant tangential effective force acts at a point on the body spaced from the pivotal axis thereof. The distance therebetween may be determined by equating the sum of the moments with respect to the axis of rotation to the sum of the moments of the effective forces acting on the elementary particles comprising the body. Further, a tangential reaction will be induced at the rotational axis of the body when such an impulsive force or blow is applied thereto. If the impulsive force or blow is applied to the body at one particular distance from the pivotal axis, the tangential reaction at the pivotal axis is reduced to zero; and this distance, or more particularly the point at which the body may be struck without producing a tangential reaction at the pivotal axis, is called the center of percussion.

The center of percussion of a body freely pivotal about a chosen axis may be determined by application of well known theories and formulae of engineering mechanics. For example, see "Engineering Mechanics" by Fairman and Cutshall, 2nd edition, page 220. For convenience, however, the general formula for determining the location of the center of percussion of a body is as follows:

$$q = \frac{I}{Mr}$$

where $q$ = the distance of the center of percussion from the axis about which the body is freely pivotal
$I$ = the moment of inertia of the mass of the body with respect to the pivotal axis
$M$ = the mass of the body
$r$ = the distance of the center of gravity of the body from the pivotal axis.

It may be noted that there is a special case falling within the terms of the general formula, and such case is where a body has a uniform cross-sectional area and unit weight throughout its length. In this special case, the center of percussion of the body taken with respect to a pivotal axis located at an end thereof is at a point equal to two-thirds of the length of the body as measured from the end thereof defining the pivotal axis. While this special case has application in certain environments, it is not essential that the body be of uniform area and weight, nor is it essential that the pivotal axis for the body be located at an end thereof; and in the illustrative embodiments hereinafter set forth, the more general case is considered.

Hence, my invention is in the utilization of the center of percussion principle in useful mechanical configurations that attain functional results never achieved heretofore. In these mechanical configurations, the body containing both the pivotal axis and center of percussion is frequently referred to as "linkage structure," and the pivotal axis is positioned at a location whereat the introduction of vibration thereto is objectionable or undesirable. Such linkage structure has vibratory movements imparted thereto because it is necessarily or desirably coupled to a second body that experiences vibration at least along one predetermined axis (one-directional vibration) or along at least two axes (two-directional vibration). The vibratory body is coupled to the linkage structure at the center of percussion thereof and, then, applies the impulsive forces or blows thereto at such center of percussion thereof because of its vibratory movements.

The Figure 1 embodiment

In Figure 1 a conventional sand tamper A is illustrated having a casing or barrel 10, a plunger member 11 mounted for reciprocatory movement within the barrel 10 and a butt or tamping member 12 rigidly secured to the lower end of the plunger 11. The butt 12 is illustrated in engagement with the ground or other material 13 being tamped. A connector member 14 carried upon the upper end of the casing 10 has mounted thereon an upper casing portion 15. A rigid structure is thereby provided in which the plunger member 11 reciprocates to impact the butt 12 against the ground 13. The structure thus far described is wholly conventional and well known in the art and a further description of the structure in detail is believed unnecessary.

As seen best in Figure 2, a pair of lever members 16 and 17 formed from a continuous tube or conduit 18 bent into a U-shape are rigidly secured to a transverse tube 19. The tube 19 may be welded to the lever members 16 and 17 or secured thereto by other suitable means providing a fluid-tight seal therebetween. The lever members 16 and 17 are provided adjacent their ends with plugs 20 that close the tube 18 and prevent the escape of fluid therefrom.

Pivotally mounted upon the transverse tube 19 and the base 21 of the U-shaped tube 18 are collars 22 and 23. Rigidly secured to the collar 22 is the upper casing portion 15, while a handle-hold or handle-grip member 24 is rigidly secured to the collar 23. By reference to Figure 1, it is seen that a second pair of lever members identical in construction are provided at a spaced distance below the lever members 16 and 17, and of which only the lever member 25 is visible. It is seen that the lever member 25 is rigidly secured to a tube 26, and the tube 26 is equipped with a collar 27 that is pivotally mounted thereon and that is identical with the collar 22. Similarly, at its opposite end, the lever member 25 is formed integrally with a transverse base member 28 equipped with a collar 29.

The handle-hold member 24 is provided with a passage 30 therein, and at its upper end the member 24 is equipped with threads 31 to threadedly receive one end of a valve casing 32. The valve casing 32 threadedly receives at its upper end an elbow 33 that carries a pipe or conduit 34 that is ultimately connected with a source of pressure fluid. The tube 18 forming the lever members 16 and 17 is hollow throughout and provides a passage for the flow of pressure fluid therethrough. The base member 21 is provided intermediate its ends with an aperture 35 to permit the passage of pressure fluid from the supply conduit 34 through the valve 32 and passage 30 into the lever members 16 and 17. The transverse tube 19 is also equipped with an aperture 35 to permit the passage of pressure fluid from the lever members 16 and 17 into the upper casing portion 15, which is equipped with a passage 36 therein to accommodate the flow of fluid into the lower casing portion or barrel 10 to actuate the plunger member 11.

The valve within the casing 32 is conventional and is equipped with a throttle lever 37 that may be locked by the hook 38 in the position illustrated to open the valve provided in the valve casing 32.

It is desired that a fluid-tight though pivotal connection be provided between the collar 22 and the tube 19 and the collar 23 and transverse base member 21. For this purpose, suitable packing 39 may be provided adjacent each end of the collars 22 and 23. Any suitable packing may be used, such as asbestos impregnated with graphite or leather, etc. The packing 39 may be held in place by cap nuts 40 threadedly received upon the threaded ends of the collars 22 and 23. Thus, pivotal movement between the collars 22 and 23 and the members 19 and 21, respectively, is accomplished without the leakage of pressure fluid from between these members.

The hand-hold member 24 provides the handle portion actually gripped by the workman, and it is desired that the member 24 remain substantially vibrationless while the sand tamper A and casing portions vibrate during the operation of the tool. With the parallelogram arrangement illustrated, the hand-hold member 24 not only remains vibrationless, but the workman is provided with a substantial degree of control over the movement of the tool and may shift it from place to place. The handle-hold portion 24 remains vibrationless because of the particular point of connection between the lever members and the casing 15 of the tool. Since the lever members are pivotally connected with the casing portion 15 and the hand-hold 24, any point of connection between the lever members and the casing portion 15 would provide a reduction in the amplitude of the vibrations translated from the casing portion 15 to the hand-hold member 24. However, there is only one point on each of the lever members at which the levers may be pivotally secured to the casing portion 15 so that the handle portion 24 is vibrationless during the tool operation, and that point is the center of percussion of each of the lever members.

The special case referred to hereinbefore—wherein the center of percussion of a body taken with respect to a rotational axis located at an end thereof is at a point two-thirds of the length of the body measured from such end when the body is of uniform mass throughout its length—is of interest herein because the lever members illustrated are of uniform size and mass throughout their lengths and the point of percussion or vibration application thereto is at the pivotal connection of the levers and the casing portion 15, which then is at a point two-thirds of the length of the lever members as measured from their point of connection to the handle-grip or hand-hold 24 which is their pivotal axis and is at the end of each lever. As has been indicated, however, it is not essential that the lever members be of uniform size and weight throughout their lengths for the hand-hold member 24 will remain substantially vibrationless whenever the lever members, regardless of their configuration, are secured to the vibrating casing or body 15 at the center of percussion of the lever members taken with reference to the location of the handle-grip 24 therealong.

The Figure 3 embodiment

The structural embodiment of the invention illustrated in Figure 3 is a vehicle B comprising a vibratory body 50 that is in the form of a spherical wheel adapted to ride along a surface denoted by the line 51. The vibratory wheel 50 has a relatively large diameter which in certain applications may have a vertical dimension upwardly of twenty feet. It is contemplated that the vehicle B has amphibian characteristics, and in such case the surface 51 may be land or water. Therefore, the spherical wheel 50 is preferably a buoyant body so that the vehicle B will float in water when not being propelled at high speeds thereover. It may be noted that the wheel could be cylindrical, but in the specific illustration this would restrict maneuverability of the vehicle. However, the wheel could be elongated in a transverse direction so as to have a spheroidal configuration.

The wheel is equipped with an axle 52 journalled at each end thereof for rotation in a ring-shaped inner frame 53 that extends about the wheel 50 in spaced relation therewith. Circumjacent the inner frame 53 is an outer ring-shaped frame 54 that is supported for rotational movement with respect thereto by bearings 55. In the specific exemplification, the bearings 55 are of spherical configuration and ride within tracks or races 56 and 57 provided, respectively, by the inner and outer ring frames. As will be brought out in greater detail hereinafter, the outer ring 54 may have a greater cross-sectional area at the forward end thereof, as shown at 58, to increase and correctly distribute the weight therein. Preferably, stop members (not shown) cooperative between the inner and outer ring frames will be provided to limit the rotational movement of the outer frame 54 with respect to the inner frame 53.

Rigidly secured to the outer ring frame 54 is a shell or fuselage 59 that extends rearwardly therefrom, and it defines intermediate the ends thereof a passenger or control compartment 60. The compartment may be equipped with a seat 61, control levers 62, and a transparent canopy 63. At its rear end, the fuselage has a stabilizer fin 64 extending upwardly therefrom that may be provided with a rudder 65 swingable about a generally vertical axis defined by hinges 66 and 67. Also provided at the rear end or tail of the fuselage is a small wing 68 extending outwardly therefrom on each side thereof which affords lift to elevate the tail of the fuselage into the position shown in Figure 1 when the vehicle has attained a predetermined speed. Each of the wings 68 is equipped with an aileron 69 used in turning the vehicle in a manner to be explained subsequently.

When the vehicle is at rest, the tail of the fuselage will be lowered because the inner ring 53 is freely rotatable about the axle 52, and means are provided for supporting the tail of the fuselage upon the surface 51. Such means comprises both a pontoon 70 and wheel 71, and preferably one such pontoon-wheel combination extends outwardly from each side of the fuselage. The pontoon 70 is rigidly secured to the fuselage 59 by struts 72 and 73, and the wheel 71 is mounted within an opening provided therefor in the pontoon and is journalled for free rotation. Thus, if the surface 51 comprises a body of water, the pontoons 70 will support the tail of the vehicle; while if the surface comprises land, the wheels 71 will engage therewith.

Mounted within the fuselage 59 adjacent the forward end thereof is a prime mover or power source designated diagrammatically at 74. The prime mover 74 may be a free-piston engine that supplies compressed air or other gaseous fluid through a flexible conduit 75 to an air motor 76 provided adjacent each end of the axle 52. The air motors may have the stators thereon rigidly connected on the inner ring frame 53, and the rotors connected with the axle 52 so as to drive the same. In order to accommodate the motors, the spherical wheel may have a flattened portion 77 at each end of the axle to increase the space between the inner ring 53 and the wheel at such locations. The fuselage 59 is provided with a cowl 78 that defines an air inlet for the prime mover 74.

The wheel 50 comprises the vibratory body, and the ring frames 53 and 54 together with the fuselage 59 define the element in which the occurrence of vibration at a predetermined point therealong is objectionable. The compartment 60, and specifically the seat 61 thereof, is the location at which the introduction of vibration is eliminated. Thus, this location wherever it is selected along the fuselage 59, forms the reference point from which the center of percussion is determined as to the composite structure comprising rings 53 and 54 and fuselage 59. The vibratory body or wheel 50 must then be pivotally connected to this composite structure at such center of percussion, and this is the relationship shown in Figure 3.

The general considerations for determining the center of percussion of a body have been set forth hereinbefore, and need not be discussed again. As noted in such prior discussion, the body need not be symmetrical; and thus, selecting the pivotal connection of such composite structure 53—54—59 to the vibratory wheel 50 as the center of percussion thereof, the corresponding location of the non-vibratory compartment 60 may be shifted along the fuselage by design alterations changing the distribution of the mass of the composite structure as, for example, by increasing the cross-sectional area of the ring 54 along a portion thereof, as at 58.

When the vehicle B is at rest, it will be supported at three points—namely, by the wheel 50 and the two spaced pontoons 70 or wheels 71, depending upon the character of the surface 51. As the vehicle is accelerated, lift is developed beneath the wings 68 in accordance with well known aerodynamic principles to elevate the tail of the fuselage 59 into the position shown in Figure 3. At any given velocity, with the ailerons 69 properly adjusted, this lift comprises the necessary constant force to maintain the fixed weight of the fuselage in a generally horizontal plane. If the vehicle traverses rough terrain or a water surface at a relatively high velocity, the vibrations imparted thereby to the wheel 50 may be expected to reach very high amplitudes, possible as much as several feet. The resulting vertical vibratory forces will be imparted to the composite structure 53—54—59 at the center of percussion thereof; and while the forward end of this structure must vibrate vertically through amplitudes as large as those experienced by the wheel, the compartment 60 will remain vibrationless by virtue of being located at the reference or pivot point thereof corresponding to such center of percussion.

Also, the rigid fuselage-and-outer-ring combination 59—54 is horizontally rotatable with respect to the spherical wheel 50 about a vertical axis through the center thereof (through the origin of rings 53 and 54) that is generally normal to the surface 51 because of the rotational inter-relation of the rings 53 and 54. Thus, lateral or transversely oriented horizontal vibration (that is, developed in the direction of the longitudinal axis of the axle 52) is not imparted to the compartment 60 by virtue of the above noted location thereof. Consequently, the invention as embodied in the vehicle illustrated in Figure 3 accommodates two-directional vibration—namely, vertical and transverse horizontal vibrations appearing at the wheel 50, and does not transmit such vibrations to the compartment 60.

The direction of movement of the vehicle B is controlled by manipulation of the ailerons 69. If the aileron on one side of the fuselage is depressed while that on the other side is raised, the entire structure will rotate slightly around the longitudinal axis thereof because of the resultant aerodynamic forces acting on the aileron surfaces, whereupon the spherical wheel 50 will engage the surface 51 along a circumference off-set from the major rolling circumference of the wheel and necessarily will describe an arcuate path as it rolls on the surface 51, and as a consequence the vehicle will turn. Therefore, the more the vehicle is rotated about its longitudinal axis, the sharper will be the turn executed thereby and, obviously, the direction of the turn is toward the elevated aileron. It will be apparent that trim tabs, etc. may be incorporated in the vehicle as well as a stop bracket 79 secured to the inner ring 53 to prevent upward movement of the outer ring 54 relative thereto.

*The Figure 4 embodiment*

The vehicle B' shown in Figure 4 comprises a fuselage 100 equipped with longitudinally shaped wheels 101 and 102 adapted to ride on a surface indicated by the line 103. The wheels 101 and 102 are preferably spherical, and are equipped with axles 104 and 105 that are journalled for rotation in the fuselage 100. The fuselage contains a prime mover 106, that again may be a free-piston engine supplying compressed gas through a conduit 107 to an air motor 108 that drives the wheel 102. If desired, air motors may be used to drive the wheel 101. This portion of the vehicle may be similar to that described with reference to the vehicle of Figure 3.

At its rear end, the fuselage 100 is provided with a wall 109 having a ball socket 110 formed therein that receives a ball 111 provided by a linkage element 112. As is well known, the ball and socket combination 110—111 defines a universal joint that permits relatively free articulation in all directions of the linkage element 112 with respect to the fuselage 100. At its rear end, this linkage element 112 defines a compartment 113 having a hollow, generally hemi-spherical socket 114. Nested within this socket is a seating element 115 of corresponding hemi-spherical configuration, adapted to move freely within the socket 114. The seating element 115 contains an operator's chair 116 and controls 117 which will be provided with flexible shaft means (not shown) to permit manipulation of the vehicle controls irrespective of the relative positions of the seat 115 and its socket 114. The compartment may be covered with a canopy 118, and preferably a shell 119 surrounds the linkage element 112 to provide a relatively continuous streamlined configuration, and is connected to the fuselage 100 by a flexible coupling or diaphragm 120.

Controls for turning the vehicle B' may be provided in accordance with those of vehicle B described hereinbefore. However, wing elements corresponding to the wings 68 of that embodimnet need not be incorporated herein because the linkage 112 and its associated members—namely, the shell 119, compartment 113, etc.—are supported in the position shown in Figure 4 by a constant force developed in another manner. This arrangement comprises a constant-force coupling 121 operative between the linkage 112 and fuselage 100. This coupling includes a cylinder 122 affixed at one end thereof to the fuselage 100 by a ball joint connection 123 that permits universal movement thereof. Mounted for reciprocatory movement within the cylinder 122 is a piston equipped with a rod 124 affixed at its outer end to the linkage 112 by ball joint connection 125. The cylinder is supplied with air under pressure through a flexible conduit 126 that communicates with a tank 127 that defines a relatively large constant pressure space therein, and which comprises part of the properly distributed mass of the linkage member 112. The tank is supplied with air from the prime mover through a hose 128.

As hereinbefore indicated, the coupling 121 applies a substantially constant pulling force between the linkage 112 and fuselage 100; and for details of this structural arrangement and its vibration-isolating utility, reference may be made to my prior patent, No. 2,400,650, issued May 21, 1946.

The point at which the vibratory body (i.e., the wheel-and-fuselage unit 100—101—102) supports the linkage 112, defining together with its associated components a composite linkage element having the compartment 113 as the desirably vibrationless point or position therealong, is at the center of the ball joint which is coincident with the center of percussion of such composite structure as determined with respect to such point or position, wherefore vibration actually is eliminated at the compartment 113. Evidently, as the vehicle traverses a rough or irregular surface, the wheel-and-fuselage unit may experience both vertical and horizontal vibratory movements of various amplitudes which are imparted through the ball joint 110—111 to this composite linkage element at such center of percussion thereof, whence such two-directional vibratory movements are not transferred to the compartment 113. Thus, the vehicle B' is also an embodiment of the invention wherein multi-directional vibratory motions are accommodated and locally eliminated.

It will be apparent that in both of the vehicles B and B', the driver's compartment, integrally comprised by linkage structure which couples the same to the vehicle wheel or wheels, will pivot or rock slightly about vertical and transverse axes as the linkage structure is vibrated in corresponding directions. Thus, in the case of vehicle B, the seat 61 will oscillate pivotally or angularly through relatively small amplitudes even though it is prevented by the described means from vibrating translationally. But such pivotal movements are not transmitted to the driver of vehicle B' because of the free movement afforded for the ball-seat element 115—116 within its socket 114, and therefore the driver is fully isolated from both translational and angular vibrations. It should be noted, however, that the amplitude of such pivotal movements of the respective compartments may be diminished by increasing the distance between the compartment and the center of percussion of the linkage element comprising the same which, as stated hereinbefore, may be accomplished by properly distributing the mass of the linkage elements.

While in the foregoing specification embodiments of the invention have been set forth in considerable detail for purposes of making an adequate disclosure thereof, it will be apparent to those skilled in the art that numerous changes may be made in those details without departing from the principles and spirit of the invention.

I claim:

1. In combination, a vibratory body subject to vibratory movements generally along a predetermined axis, a linkage structure having a position therealong at which the presence of corresponding vibratory movements in the direction of said axis is undesirable and such position defining a pivotal axis for said linkage structure generally normal to a plane defined by said predetermined axis and such position, and coupling structure connecting said linkage structure with said vibratory body for relative angular movement therebetween about an axis substantially parallel to said pivotal axis and generally normal to said predetermined axis, said axis of angular movement being located substantially at the center of percussion of the linkage structure taken with reference to such position and pivotal axis defined thereby.

2. The combination of claim 1 in which said vibratory body comprises a wheel adapted to rollingly engage a support surface therefor, and in which said linkage structure comprises a fuselage defining an operator's compartment as the position whereat the presence of vibratory movements along said predetermined axis is undesirable.

3. The combination of claim 2 in which means are provided for supporting said fuselage at a relatively continuous angular orientation with respect to the axis of rotation of said wheel at least when the fuselage is being propelled at some predetermined velocity.

4. The combination of claim 3 in which said last mentioned means is characterized by providing a substantially constant force support.

5. The combination of claim 2 in which said wheel is a relatively large buoyant body to effect a rolling engagement with both land and water surfaces.

6. The combination of claim 2 in which said coupling structure connecting said linkage structure with said vibratory body comprises a universal joint.

7. In combination, a vibratory body subject to vibratory movements having components along predetermined axes generally normal to each other, a linkage structure having a position therealong at which the presence of corresponding vibratory movements in the direction of each of said axes is undesirable and such position defining pivotal axes for said linkage structure substantially normal to each other and generally normal respectively to the planes defined by each of said predetermined axes and such position, coupling structure connecting said linkage structure with said vibratory body for relative angular movement therebetween about an axis substantially parallel to one of said pivotal axes and generally normal to one of said predetermined axes and also connecting said linkage structure with said vibratory body for relative angular movement therebetween about an axis substantially parallel to the other of said pivotal axes and generally normal to the other of said predetermined axes, both of the axes of angular movement being located substantially at the center of percussion of the linkage structure taken with reference to such position and the respective pivotal axes defined thereby.

8. In combination, a vibratory body subject to vibratory movements generally along a predetermined axis, a linkage structure having a position therealong at which the presence of corresponding vibratory movements in the direction of said axis is undesirable and such position defining a pivotal axis for said linkage structure generally normal to a plane defined by said predetermined axis and such position, and coupling structure connecting said linkage structure with said vibratory body at the center of percussion of the linkage structure determined with respect to such position and said pivotal axis defined thereby.

9. The combination of claim 8 in which said coupling structure defines a pivotal connection between said vibratory body and linkage structure.

10. The combination of claim 8 in which said coupling structure defines a connection affording articulation of said linkage structure relative to said vibratory body.

11. The combination of claim 8 in which means are provided for supporting said linkage structure at a relatively continuous angular orientation with respect to said vibratory body.

12. The combination of claim 11 in which such support means provides a substantially constant force.

13. In combination, a wheel element subject to vibratory movements generally along a predetermined axis, a fuselage structure having an operator's position therealong at which the presence of corresponding vibratory movements in the direction of said axis is undesirable and such position defining a pivotal axis for said fuselage structure generally normal to a plane defined by said predetermined axis and such position, and means connecting said fuselage structure with said wheel element substantially at the center of percussion of the fuselage structure determined with respect to such operator's position and said pivotal axis defined thereby.

14. In a structure of the character described, a wheel element subject to vibratory movements generally along a predetermined axis, a fuselage structure having an operator's position therealong at which the presence of corresponding vibratory movements in the direction of said axis is undesirable and such position defining a pivotal axis for said fuselage structure generally normal to a plane defined by said predetermined axis and such operator's position, and means connecting said fuselage structure with said wheel element for relative angular movement therebetween about an axis substantially parallel to said pivotal axis and generally normal to said predetermined axis, said axis of angular movement being located substantially at the center of percussion of the fuselage structure determined with respect to such operator's position and said pivotal axis defined thereby.

15. The structure of claim 14 in which said wheel element comprises a relatively large buoyant body to effect a rolling engagement with both land and aqueous surfaces.

16. The structure of claim 15 in which means are provided for supporting said fuselage structure at a relatively continuous angular orientation with respect to the axis of rotation of said wheel element at least when the fuselage structure is being propelled at some predetermined velocity.

17. The structure of claim 16 wherein said last mentioned means provides a substantially constant-force means.

18. In combination, a vibratory body subject to vibratory movements having components along predetermined axes generally normal to each other, a linkage structure having a position therealong at which the presence of vibratory movements in the direction of either of said axes is undesirable and such position defining pivotal axes for said linkage structure generally normal to each other and generally normal respectively to the planes defined by each of said predetermined axes and such position, and means connecting said linkage structure with said vibratory body substantially at the center of percussion of the linkage structure with respect to such position and the respective pivotal axes defined thereby.

19. In combination, a wheel element subject to vibratory movements having components along predetermined axes generally normal to each other, a fuselage structure having an operator's position therealong at which the presence of vibratory movements in the direction of either of said axes is undesirable and such position being intersected by pivotal axes for said fuselage structure substantially normal to each other and generally normal respectively to planes defined by each of said predetermined axes and such position, and means connecting said fuselage structure with said wheel element substantially at the center of percussion of the fuselage structure determined with respect to such operator's position intersected by the respective pivotal axes.

20. The combination of claim 19 in which said means defines an interconnection of said fuselage structure and wheel element providing for relative angular movement therebetween about an axis substantially parallel to one of said pivotal axes and generally normal to one of said predetermined axes.

21. The combination of claim 19 in which said means defines an interconnection of said fuselage structure and wheel element providing for relative angular movement therebetween about an axis substantially parallel to one of said pivotal axes and generally normal to one of said predetermined axes and also for relative angular movement therebetween about an axis substantially parallel to the other of said pivotal axes and generally normal to the other of said predetermined axes.

22. The combination of claim 21 in which said means comprises a first connector ring supported for pivotal movement about the rotational axis of said wheel element and a second connector ring circumjacent said first ring and supported for rotational movement about the circumferential surface thereof, said second ring being fixedly secured to said fuselage structure.

23. The combination of claim 22 in which means are provided remote from said connector rings for supporting said fuselage structure, said support means comprising a surface-engaging element for so supporting said fuselage structure when the velocity thereof is less than the predetermined value and an aileron assembly for so supporting said fuselage structure when the velocity thereof exceeds such predetermined value.

24. The combination of claim 21 in which said means comprises a universal joint.

25. The combination of claim 24 in which means are provided for supporting said fuselage structure at a relatively constant angular orientation with respect to said wheel element, said support means comprising a substantially constant-force fluid pressure cylinder and piston composition effectively operative between said fuselage structure and wheel element.

26. The combination of claim 25 in which said operator's position comprises a hemi-spherical socket provided by said fuselage structure and a complementary hemi-spherical seating element nested therein for generally universal articulation.

27. In combination with a tool that vibrates freely during the operation thereof, a substantially vibrationless handle therefor comprising a pair of substantially parallel lever members secured to said tool adjacent the upper end thereof for pivotal movement about axes substantially normal to the longitudinal axis of said tool, said lever members being disposed one above the other, and a handle-grip pivotally secured to said lever members adjacent an end thereof, said lever members being secured to said tool adjacent the center of percussion of the lever members as determined with reference to the point of connection to the handle-grip.

28. In combination with a tool that vibrates freely during the operation thereof, a substantially vibrationless handle therefor comprising a pair of generally parallel lever members secured to said tool adjacent the upper end thereof for pivotal movement about an axis substantially normal to the longitudinal axis of said tool, said lever members being disposed in side-by-side relation, a second pair of generally parallel lever members secured to said tool at a point spaced below said first-mentioned pair of lever members for pivotal movement about an axis substantially normal to the longitudinal axis of said tool, said second pair of lever members being disposed in side-by-side relation, and a handle-grip pivotally secured to all of said lever members adjacent an end thereof, all of said lever members being pivotally secured to said tool adjacent the center of percussion of the members as determined with reference to their point of connection to said handle-grip.

29. The structure of claim 28 in which at least one of said lever members is hollow to provide a passage for the flow of pressure fluid therethrough and into said casing, and means are provided for supplying a source of pressure fluid to said lever member.

30. In a vibratory tool having a casing that normally vibrates during at least certain phases of the tool operation, at least one lever element equipped with a hand-hold member, each such lever element being pivotally connected intermediate the ends thereof to said casing about an axis substantially normal to the axis of vibratory movement of said casing, the point of pivotal connection between said casing and each such lever element being at substantially the center of percussion thereof as determined with respect to the point of location of said hand-hold member.

31. In combination, a mass member adapted to vibrate and thereby produce vibratory movements generally along at least one predetermined axis, and handle means for said mass member, said handle means being pivotally connected to said mass member at one of two spaced preselected points along said handle means, said two preselected points being so related that the input vibration from said mass member at said one preselected point is ineffective to produce any substantial vibration at the second of said preselected points in the direction of said predetermined axis, and hand-hold means at said second of the preselected points.

No references cited.